Patented Sept. 21, 1943

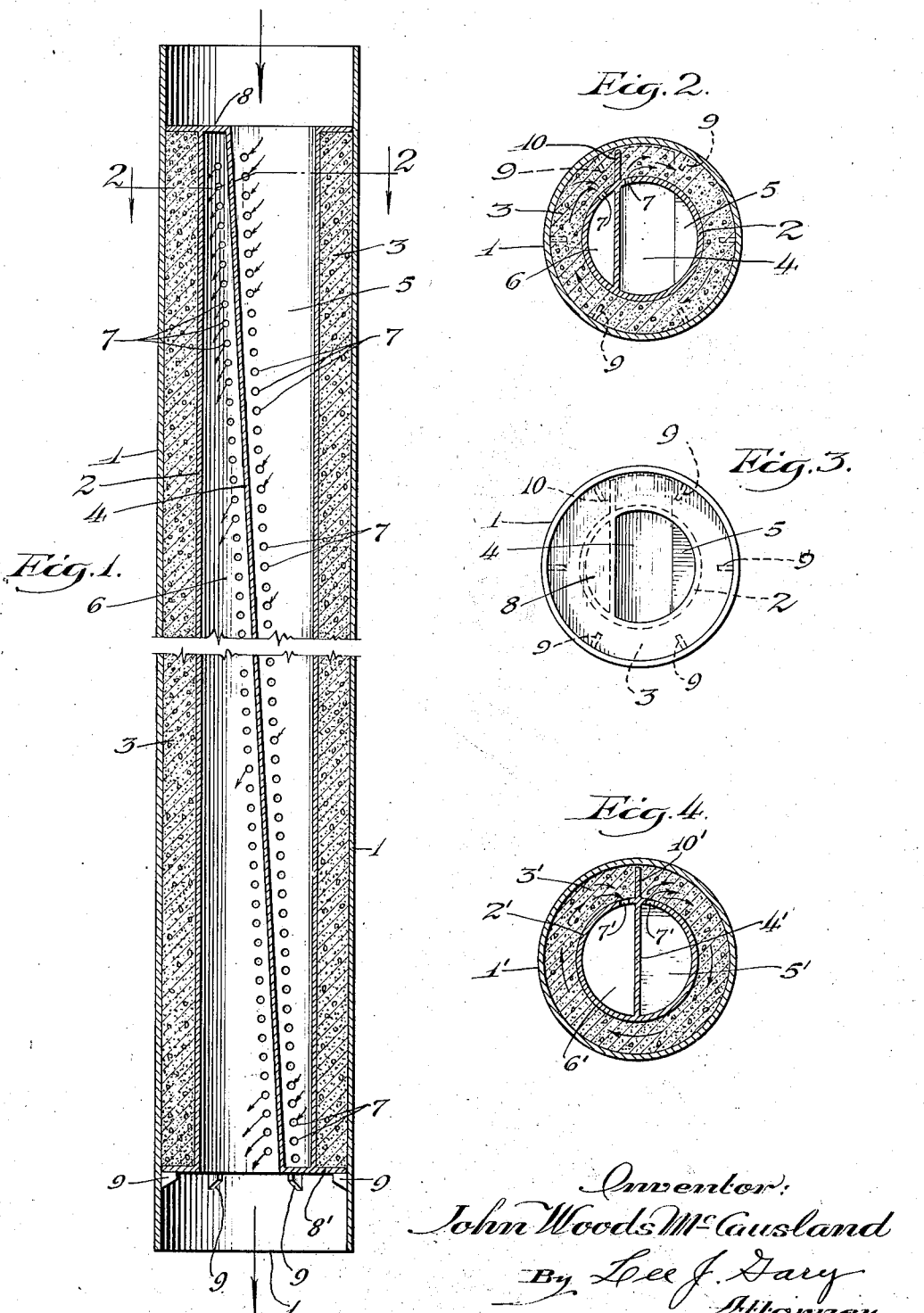

2,329,847

UNITED STATES PATENT OFFICE 2,329,847

CATALYTIC REACTOR

John Woods McCausland, Chicago, Ill., assignor to Universal Oil Products Company, Chicago, Ill., a corporation of Delaware Application May 9, 1941, Serial No. 392,656

9 Claims. (Cl. 23—288)

This is a continuation-in-part of my co-pending application Serial No. 347,142, filed on July 24, 1940, which has matured into Patent No. 2,252,719, Aug. 19, 1941.

In the above mentioned parent application I have disclosed an improved form of reactor comprising elongated tubular elements disposed one within the other with an annular space therebetween for the reception of a bed of catalyst or contact material, the inner tube being provided with a longitudinal partition dividing the space therein into an elongated inlet passageway for fluid reactants to be converted and an elongated outlet passageway for fluid reaction products. Openings are provided in the wall of the central tube at substantially diametrically opposite points therein along its length and on opposite sides of the partition, these openings establishing communication between the inlet and outlet passageways and the annular space occupied by the catalyst or contact material so that incoming reactants will flow from the inlet passageway on one side of the partition in the central tube into the annular space and through the contact material therein around substantially one-half the periphery of the inner tube and into the outlet passageway on the opposite side of the partition.

The present invention provides other forms of reactors of the same general type as disclosed in my aforementioned co-pending application which retain the important advantages of the specific forms disclosed in the parent case, have certain advantages thereover. In common with the invention of the parent application, the improved reactors herein disclosed have a wide range of applications to conversion processes which are catalytically promoted or directed by the contact material, or in which the latter is a relatively inert substance acting to increase the intimacy of contact between the reactants, or wherein the contact material enters into the reaction.

In common with the specific forms of reactors which I have previously disclosed, the improved forms herein provided are particularly advantageous as applied to processes, such as, for example, the catalytic dehydrogenation of hydrocarbons, wherein low operating pressures are desired and wherein the operating pressure is rather critical and must be maintained, within relatively narrow limits, at a substantially constant value throughout the reaction zone, as explained in the aforementioned parent application.

The accompanying drawing diagrammatically illustrates two specific forms of the improved reactor provided by the present invention.

Figure 1 of the drawing represents a longitudinal section through a tubular element incorporating the features of the invention.

Figure 2 is a cross-sectional view of the tubular element shown in Figure 1, this section being taken along line 2—2 in Figure 1.

Figure 3 is an end view of the tubular elements shown in Figure 1.

Figure 4 is a cross-sectional view of a modified form of tubular element embodying the features of the invention.

Referring to Figures 1, 2 and 3, the outer wall 1 of the reactor tube here illustrated is substantially circular in cross-section and may be provided at its opposite ends with suitable inlet and outlet fittings, not illustrated, or a plurality of such elements may extend between and be secured to tube sheets or the like in any convenient form of tubular heat exchanger, not illustrated, whereby a convective medium for supplying heat to or extracting heat from the reaction taking place in the tubes may be circulated about the outer walls thereof.

The inner wall 2 of the tubular element is formed by another tube of substantially circular and smaller cross-sectional area which is disposed concentrically within the larger tube and extends to adjacent the opposite ends of the latter. The tube 2 is sufficiently smaller in diameter than the tube 1 that an annular space of the desired cross-sectional area is provided therebetween for the reception of a bed of solid granular catalyst or contact material indicated at 3.

The space enclosed by the inner wall or tube 2 is divided by a longitudinal partition plate 4 into an inlet zone 5 and an outlet zone 6 disposed on opposite sides of the partition. In the particular construction illustrated in Figures 1, 2 and 3, the baffle 4 is angularly disposed within tube 2 in such a manner that the inlet zone 5 is of decreasing cross-sectional area from top to bottom and the outlet zone 6 is of increasing cross-sectional area from top to bottom. Adjacent and on opposite sides of partition 4, openings 7 are provided through the wall 2, these openings being disposed, in the case here illustrated, at spaced points along the length of wall 2 and the openings on opposite sides of the partition 4 being in substantially parallel alignment with the latter.

The annular space occupied by the bed of catalyst or contact material and the top of outlet zone 6 are closed by member 8 which, in this instance, is a substantially disc-shaped plate or the like welded or otherwise secured to the inner tube 2 and partition 4 at their ends. A similar closure member 8' for the annular space occupied by the catalyst or contact material and the inlet zone 5 is provided at the lower end of the inner tube 2 and, in this particular instance, also serves as a means of supporting the assembly comprising the inner tube and the partition, as well as the contact material disposed in the annular space, from the outer wall 1. Suitable supporting lugs 9 or the like are provided on the outer wall 1 and plate 8' rests upon these lugs.

In the construction here illustrated (see Figures 2 and 3), an extension or continuation 10 of partition 4 projects into and substantially across the annular space occupied by the catalyst or contact material to provide a deflector or baffle for fluid passing through the annular space from the inlet zone 5 to the outlet zone 6. The general path of flow of the fluid to be contacted with the catalyst or contact material is illustrated by the arrows in Figures 1 and 2 and it will be noted that the fluid emerging from zone 5 through openings 7 on the right-hand side of partition 4 and deflecting member 10, flows clockwise through the annular space and enters outlet zone 6 through the openings 7 on the opposite side of the partition 4 and deflecting member 10. The liquid to be contacted with the solid granular material enters zone 5 from its upper end and is discharged from the lower end of zone 6. Thus, a relatively short path of travel is provided for the fluid in contact with the bed 3 of solid granular catalyst or contact material, giving a relatively low pressure drop through the reactor tube, but uniform and intimate contact between the fluid reactants and the solid granular material.

It will, of course, be understood that the general direction of flow of fluid through the reactor tube may be upward instead of downward, in which case zone 6 is the inlet zone and zone 5 is the outlet zone. The direction of flow through the annular space in which the contact material is disposed may be either clockwise or counterclockwise, depending upon the position of partition 4 and upon the position of the inlet and outlet ends of the tube. The tubes may be made as large or as small as desired and, depending upon the relative size of the inner and outer tubes, the annular space therebetween may be designed to give the desired time of contact between the fluid reactants and the solid granular material.

The modified form of reactor tube illustrated in Figure 4 is substantially the same as that shown in Figures 1, 2 and 3, except for the position of the partition which divides the inner tube and the annular space between the tubes. In Figure 4, the outer tube is designated by the reference number 1' and the inner tube by the reference number 2', the longitudinal partition, which in this particular instance is substantially vertical and passes along its entire length through the vertical center line of the assembly, is designated by the reference number 4' and the extension of partition 4', which divides the annular space 3' between the tubes, is designated by the reference numeral 10'. The openings which establish communication between the inlet and outlet compartments 5' and 6', respectively, of the reactor tube shown in Figure 4 are disposed adjacent and on opposite sides of members 4' and 10' and are designated by the reference numeral 7'.

I claim as my invention:

1. An apparatus for obtaining contact between a stream of fluid and a mass of solid granular material comprising, in combination, a pair of elongated tubular elements disposed one within the other with an annular space adapted to receive said mass therebetween, a partition extending across and lengthwise of the inner tube and projecting from its outer surface to adjacent the inner surface of the outer tube, the space within the inner tube on one side of said partition being closed at one end and open at the opposite end, the space on the opposite side of said partition being open at said opposite end and closed at its other end and each of said spaces being in communication with said annular space through openings provided through the wall of said inner tube on opposite sides of and adjacent the partition.

2. The apparatus defined in claim 1 wherein said partition is disposed in angular relation to the longitudinal center line of the inner tube whereby said spaces within the latter on opposite sides of the partition are each of decreasing cross-sectional area from the open to the closed ends thereof.

3. The apparatus defined in claim 1 wherein said tubes are disposed in a substantially vertical position and the inner tube is supported adjacent its lower end from the walls of the outer tube.

4. The apparatus defined in claim 1 wherein said tubes are disposed in a substantially vertical position and the inner tube is supported adjacent its lower end from the walls of the outer tube and is removable therefrom.

5. The apparatus defined in claim 1 wherein said partition is substantially parallel throughout its length to the longitudinal center line of the inner tube.

6. The apparatus defined in claim 1 wherein said spaces within the inner tube on opposite sides of the partition are each of substantially the same cubic volume.

7. The apparatus defined in claim 1 wherein said spaces within the inner tube on opposite sides of the partition are of substantially equal cubic volume and are each of substantially uniform cross-sectional area throughout their length.

8. The apparatus defined in claim 1 wherein said tubes are substantially concentric.

9. The apparatus defined in claim 1 wherein said annular space is closed at the top and bottom and is adapted to contain a mass of solid granular contact material.

JOHN WOODS McCAUSLAND.